United States Patent
Lovett et al.

(10) Patent No.: US 10,124,725 B2
(45) Date of Patent: Nov. 13, 2018

(54) CUSTOMIZABLE VEHICLE CHARGE STATUS TONES

(71) Applicant: FORD GLOBAL TECHNOLOGIES, LLC, Dearborn, MI (US)

(72) Inventors: Karin Lovett, Novi, MI (US); Bryan Michael Bolger, Canton, MI (US); Robert David Hancasky, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/057,177

(22) Filed: Mar. 1, 2016

(65) Prior Publication Data
US 2017/0253180 A1     Sep. 7, 2017

(51) Int. Cl.
*B60Q 9/00* (2006.01)
*H02J 7/00* (2006.01)
*B60L 11/18* (2006.01)

(52) U.S. Cl.
CPC .......... *B60Q 9/00* (2013.01); *B60L 11/1809* (2013.01); *B60L 11/1861* (2013.01); *H02J 7/0029* (2013.01); *H02J 7/0047* (2013.01); *H02J 2007/0037* (2013.01)

(58) Field of Classification Search
CPC ......... B60W 2510/244; B60Y 2300/91; G08B 21/182
USPC ...... 340/455, 636.1, 639.19, 636.2; 320/107, 320/136, 137
See application file for complete search history.

(56) References Cited

U.S. PATENT DOCUMENTS

| | | | |
|---|---|---|---|
| 8,125,181 B2 | 2/2012 | Gregg et al. | |
| 8,896,266 B2 | 11/2014 | Ohtomo | |
| 9,796,280 B2* | 10/2017 | McCool | B60L 11/182 |
| 9,806,544 B2* | 10/2017 | Blyde | H02J 7/0021 |
| 2002/0171397 A1* | 11/2002 | Adrian | H01M 6/5033 320/119 |
| 2009/0302801 A1* | 12/2009 | Katsunaga | B60L 11/1816 320/109 |
| 2011/0078092 A1* | 3/2011 | Kim | B60L 11/1824 705/412 |
| 2011/0267009 A1* | 11/2011 | Nakatsuji | H01M 2/34 320/152 |
| 2011/0282527 A1* | 11/2011 | Inbarajan | B60L 11/1809 701/22 |
| 2013/0110340 A1 | 5/2013 | Park et al. | |
| 2014/0214242 A1* | 7/2014 | Seo | B60L 11/1861 701/2 |
| 2015/0291145 A1* | 10/2015 | Yu | B60W 10/06 701/22 |

(Continued)

FOREIGN PATENT DOCUMENTS

GB    2513394 A    10/2014

*Primary Examiner* — Phung Nguyen
(74) *Attorney, Agent, or Firm* — David B. Kelley; Brooks Kushman P.C.

(57) ABSTRACT

A vehicle includes an audio transducer and a controller. The controller is configured to, in response to a state of charge (SOC) of a battery crossing a charge level threshold (CLT) set by a user of the vehicle, activate the audio transducer to generate an indication that the SOC has crossed the CLT and that is defined by data provided by the user and linked with the CLT according to a rule specified by the user.

16 Claims, 2 Drawing Sheets

(56) References Cited

U.S. PATENT DOCUMENTS

2016/0090000 A1\* 3/2016 Eifert .................. B60L 11/1861
320/148

\* cited by examiner

CUSTOMIZABLE VEHICLE CHARGE STATUS TONES

TECHNICAL FIELD

The present disclosure relates to charge status indicators for hybrid and electric vehicles.

BACKGROUND

Some hybrid and electric vehicles use a charge port to connect the vehicle to a charge cable when the battery needs to be recharged. The vehicle may provide an indication of a proper connection between the charge cable and the charge port to alert the driver that the vehicle is being recharged. Once properly connected, the vehicle battery will continue to charge until the charge cable is disconnected from the charge port or the charge operation is otherwise terminated.

SUMMARY

A system includes a controller configured to, in response to a charge for a vehicle battery exceeding a first threshold, activate a transducer to produce a first user-specified sound. The first user-specified sound indicates that the charge has exceeded the first threshold. The controller is also configured to, in response to the charge exceeding a second threshold, activate the transducer to produce a second user-specified sound different than the first to indicate that the charge has exceeded the second threshold.

A vehicle includes an audio transducer and a controller. The controller is configured to, in response to a state of charge (SOC) of a battery crossing a charge level threshold (CLT) set by a user of the vehicle, activate the audio transducer to generate an indication that the SOC has crossed the CLT and that is defined by data provided by the user and linked with the CLT according to a rule specified by the user.

A control method for a vehicle includes, in response to a state of charge (SOC) of a battery crossing a charge level threshold (CLT) set by a user of the vehicle, activating by a controller a transducer to generate an indication that the SOC has crossed the CLT and that is defined by data provided by the user and linked with the CLT according to a rule specified by the user.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
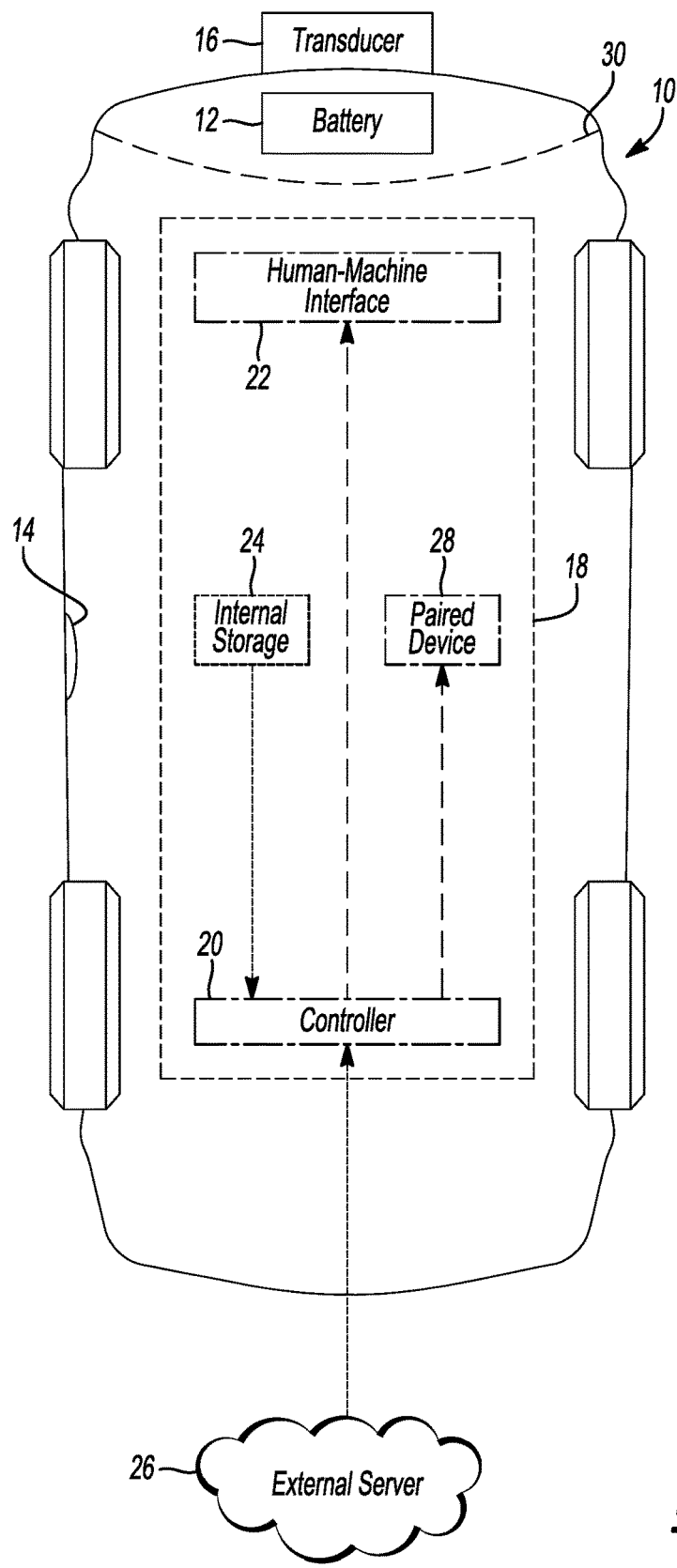
FIG. 1 is schematic view of a vehicle.

FIG. 1 depicts a top schematic view of a vehicle 10. The vehicle 10 includes a battery 12, a charge port 14, and a transducer 16. The charge port 14 may be used to charge the battery 12 using a traditional battery charging source (not shown). Typically, a user may attach a charge cable to the charge port 14 to allow the battery 12 to store energy used for travel. However, wireless charging may also be contemplated by this disclosure. The vehicle 10 further includes a battery charging alert system 18. The battery charging alert system 18 may include a controller 20, a human machine interface 22, an internal storage 24, and an external server 26. Further, a device 28 may be paired with the controller 20 to communicate information exchanged through the battery charge alert system. The device 28 may be paired with the controller 20 via a Bluetooth network, Wi-Fi network, dedicated short range communication, or by direct wired communication. Although described below as using the transducer 16, the battery charging alert system 18 may also instruct the controller 20 to provide the indications through the human machine interface 22.

During use, the battery 12 may deplete in charge and require recharging. Recharging of the battery 12 may occur at any point in which the battery 12 does not have a substantially complete charge. For example, a user may connect the charge cable to the charge port 14 when the battery is completely depleted or partially depleted during such a time as the battery 12 is anywhere from 1% charge through 99% charge. During use, the controller 20 may provide charge level indications through the interface to provide information as to the charge level of the battery 12. Likewise, the controller 20 may provide charge level indications through the transducer 16 to provide charge level indications while the battery 12 reaches various charge levels. As will be described in more detail below, the charge level indications may be made using audible or visual feedback.

For example, when a state of charge for the battery 12 crosses a threshold, the controller 20 may activate the transducer 16 to provide an audible tone identifying the threshold. Typically, the audible tones are preloaded by a manufacturer of the vehicle 10 and a driver must learn which audible tone coincides with which threshold for the state of charge of the battery 12. Also, the thresholds may be preloaded by the manufacturer of vehicle 10. For example, manufacturers typically divide the thresholds into quarters such that the state of charge of the battery 12 crosses thresholds at 25%, 50%, 75%, and completely charged. However, customization of the charge level threshold of the battery 12 may also be implemented.

The driver may desire to specify the charge level threshold of the state of charge of the battery 12. Customization of both the indication of the charge level threshold of the battery 12 as well as the charge level threshold at which the indication is produced may be advantageous. For example, a driver may prefer a certain tone be produced by the transducer 16 for every crossing of the charge level threshold. Likewise, the driver may prefer that different tones be produced by the transducer 16 based on crossing of different charge level thresholds and configure the controller 20 to produce the specified tones. The driver may also prefer different variations of the charge level threshold and configure the controller 20 to produce an indication through the transducer 16 according to a rule dictating the specified charge level thresholds. For example, the driver may prefer an indication of the state of charge of the battery 12 when the battery 12 is depleted, the charge level exceeds 33%, the charge level exceeds 66%, or the battery 12 is fully charged and configure the controller 20 to produce an indication when a state of charge of the battery 12 crosses those thresholds. In other words, the charge level threshold of the battery 12 may be specified by a rule according to the driver. Therefore, a rule set forth by the driver dictating the charge level threshold may be configured into the controller 20 and produces an indication using the transducer 16.

Further, the driver may specify to the controller 20 different rules for either exceeding or falling below the charge level threshold. For example, while the battery 12 is charging, the driver may only desire indications through the transducer 16 of the battery 12 having a state of charge exceeding 33%, 66%, or fully charged. The driver may be able to specify this charge level threshold rule into the controller 20 and customize when alerts about the state of charge of the battery 12 are produced through the transducer 16. Likewise, the driver may desire to specify when the state of charge of the battery 12 falls below a certain charge level threshold. For example, while the battery 12 is being depleted, the driver may desire indications through the transducer 16 that the battery is falling below 75%, 50%, 25%, or the battery 12 is substantially completed. The controller 20 is configured such that the driver may use different rules for either charging of the battery 12 or depletion of the battery 12. Again, the controller 20 allows the driver to provide specified input in customized threshold levels for either exceeding a charge level threshold or falling below a charge level threshold.

The controller 20 may also specify to the transducer 16 which indication is linked with the specified charge level threshold of the battery. The driver may also specify to the controller 20 certain indications to be linked with the customized rules for both battery charging and battery depletion. For example, the driver may specify to the controller 20 the first indication be linked with the state of charge of the battery 12 exceeding 33%. The driver may also specify to the controller 20 a second indication linked with the state of charge of the battery 12 exceeding 66%. Finally the driver may also specify to the controller 20 a third indication linked with the state of charge the battery 12 being substantially completely charged. The driver may customize the first, second, and third indications such that the first indication is different from the second indication, the second indication is different from the third indication, and the first indication is different from the third indication. By using different indications for exceeding different charge level thresholds of the battery 12, the driver is provided instantaneous feedback of the state of charge of the battery 12.

The driver may also specify to the controller 20 different indications through the transducer 16 for the battery state of charge falling below certain charge level thresholds customized by the driver. For example, the driver may specify to the controller 20 a fourth indication linked with the state of charge of the battery 12 falling below 75%. The driver may also specify to the controller 20, a fifth indication linked with the state of charge of the battery 12 falling below 50%. Likewise, the driver may also specify to the controller 20 a sixth indication linked with the state of charge of the battery 12 falling below 25%. Finally, the driver may also specify to the controller 20 a seventh indication linked with the state of charge of the battery 12 being substantially depleted. As stated above, these indications may be customizable such that they are different from each other. Likewise, the indications linked with the charge level thresholds for battery charging may be different than the indications linked with the charge level thresholds for battery depletion. Therefore, when the state of charge of the battery 12 crosses a specified charge level threshold, a customized indication may be produced through the transducer 16 activated by the controller 20.

As stated above, the transducer 16 may be configured to produce either an audible or visual indication of the battery charge threshold. The transducer 16 may be a light source such that upon activation, the transducer 16 indicates a state of charge of the battery 12 using varying light patterns. For example, the transducer 16 may produce a variety of colors that illuminate at varying frequencies to indicate crossing over a charge level threshold. The driver may customize, via the controller 20, which color indicates a certain charge level threshold, as well as a blinking pattern to indicate when the battery 12 is charging or when the battery 12 is depleting. Likewise, the driver may specify to the controller 20 to use any combinations of colors or blinking patterns, which may indicate to the driver through the transducer 16 the charge state of the battery 12. This allows the controller 20 by way of the transducer 16 to provide a visual indication customized to a particular driver of the battery state of charge.

The transducer 16 may also be a speaker attached to a hood 30 of the vehicle 10. When the transducer 16 is a speaker, the battery charging alert system 18 uses the controller 20 to produce an audible tone from the transducer 16. As stated above, the battery charging alert system 18 may allow for customizable tones to be produced through the transducer 16. The driver may upload audio files from the paired device 28, which are stored on the internal storage 24. When the driver creates the rule to link the indication with the charge level threshold, the controller 20 will be configured to read the internal storage 24 and select the audio files from the paired device 28 to play the files through the transducer 16. The battery charging alert system 18 allows the driver to associate a chosen audio file with a selected charge level threshold such that when a battery state of charge crosses a specified charge level threshold, the controller 20 plays the file from the internal storage 24 through the transducer 16. The driver may select a single audio file to be played through the transducer 16 when the battery state of charge crosses a charge level threshold, or the driver may select multiple audio files to be played through the transducer according to each individual charge level threshold with either battery charging or battery depletion. The battery charging alert system 18 may also be configured to use any combination of a single file or multiple files in conjunction with any combination of charge level thresholds as customized by the driver.

For example, the controller 20 may access a single audio file from the internal storage 24 to play through the transducer 16 for each charge level threshold chosen for battery charging. The controller 20 may also access different audio files from the internal storage 24 linked to an individual charge level threshold by the driver to be played upon achieving each specific charge level threshold for battery charging. Likewise, the controller 20 may access a single audio file from the internal storage 24 to play through the transducer 16 for each charge level threshold chosen for battery depletion. The controller may also access different audio files from the internal storage 24 linked to an individual charge level threshold by the driver to be played upon achieving each specific charge level threshold for battery depletion. The battery charging alert system 18 allows the driver to upload files to customize the battery charging indications. The internal storage 24 may be able to store and the controller 20 may be able to play any type of audio file including, but not limited to, .WAV, .MP3, .MP4, or any other audio storage medium.

The audio file may also be downloaded from the external server 26. The user may access the external server 26 either through the paired device 28 or the human machine interface 22. After download from the external server 26, the audio file may be stored on the internal storage 24. The user may download any audio file made available on the external server 26. Again, the user may select an individual tone or file to play through the charging process, or may select multiple audio files to play through the charging process as various thresholds cross during either charging completion or charging depletion. For example, a single audio file may be played when the battery state of charge crosses each threshold. The single audio file may be played at various lengths when the controller 20 plays the file through the transducer 16. When the state of charge of the battery 12 crosses a 25% threshold, the audio file may be played at a first time interval. Likewise, when the battery 12 crosses a 50% threshold, the audio file may be played at a second time interval, in which the second time interval is different from the first time interval.

Also, multiple audio files may be played by the controller 20 through the transducer 16. For example, when the state of charge of the battery 12 crosses a 25% threshold, a first audio file may be played for a pre-selected time interval. Likewise, when the state of charge of the battery 12 crosses a 50% threshold, a second audio file may be played for the pre-selected time interval. The pre-selected time interval may also be determined based on a rule by the user. For example, the first audio file may be played for a first pre-selected time interval and the second audio file may be played for a second pre-selected time interval, in which the first pre-determined time interval is different from the second pre-determined time interval. Further, different audio files may be played for either charging completion or charging depletion. For example, the controller 20 plays through the transducer 16 either a single audio file or multiple audio files, as described above when the state of charge of the battery 12 is increasing and the controller 20 plays through the transducer 16 either a different single audio file or different multiple audio files when the state of charge of the battery 12 is decreasing.

The state of charge of the battery 12 may also be communicated to the paired device 28. The controller 20 may also be configured to transmit a signal to the paired device 28 indicative of the current state of charge of the battery 12. Likewise, the controller 20 may also be configured to transmit a signal to the paired device 28 when the battery 12 has a state of charge that crosses a predetermined threshold value. For example, if a user defines a rule such that the controller 20 provides an indication of the state of charge of the battery 12 upon crossing a 50% threshold, the controller 20 may also transmit a signal to the paired device 28 to notify the user that the battery 12 has a state of charge of 50%. The user may also configure the controller 20 to provide a notification to the paired device 28 when the state of charge of the battery 12 crosses any predetermined threshold or achieves any state of charge, as discussed above.

The notification received by the paired device 28 from the controller 20 may be transmitted over any potential network, such as but not limited to a cellular network, a Wi-Fi network, a Bluetooth network, dedicated short range communication, or any other communication method. Further the notification received by the paired device 28 may be any notification means, for example, SMS messages, audio alerts, flashing lights, or any other visual, audible, or haptic feedback indicators. Similar to the transducer 16, the controller 20 may be configured to provide customization of the indicator selected by the user during the threshold crossing to the paired device 28. The controller 20 may also be configured to access a single audio file, or multiple audio files based on a user preference. If a user configures the controller 20 to play audio files on the paired device 28, the audio files may be stored on the internal storage 24 or on the paired device 28. The paired device 28 may also play audio files that are different from the audio files played through the transducer 16. For example, the paired device 28 may play a first set of audio files consistent with the description above, and the transducer 16 may play a second set of audio files consistent with the description above. Allowing for audio files to be played on the paired device 28 to be different from audio files played on the transducer 16 allows for further customization when the battery 12 crosses a predetermined threshold set by a user.

Figure 2:
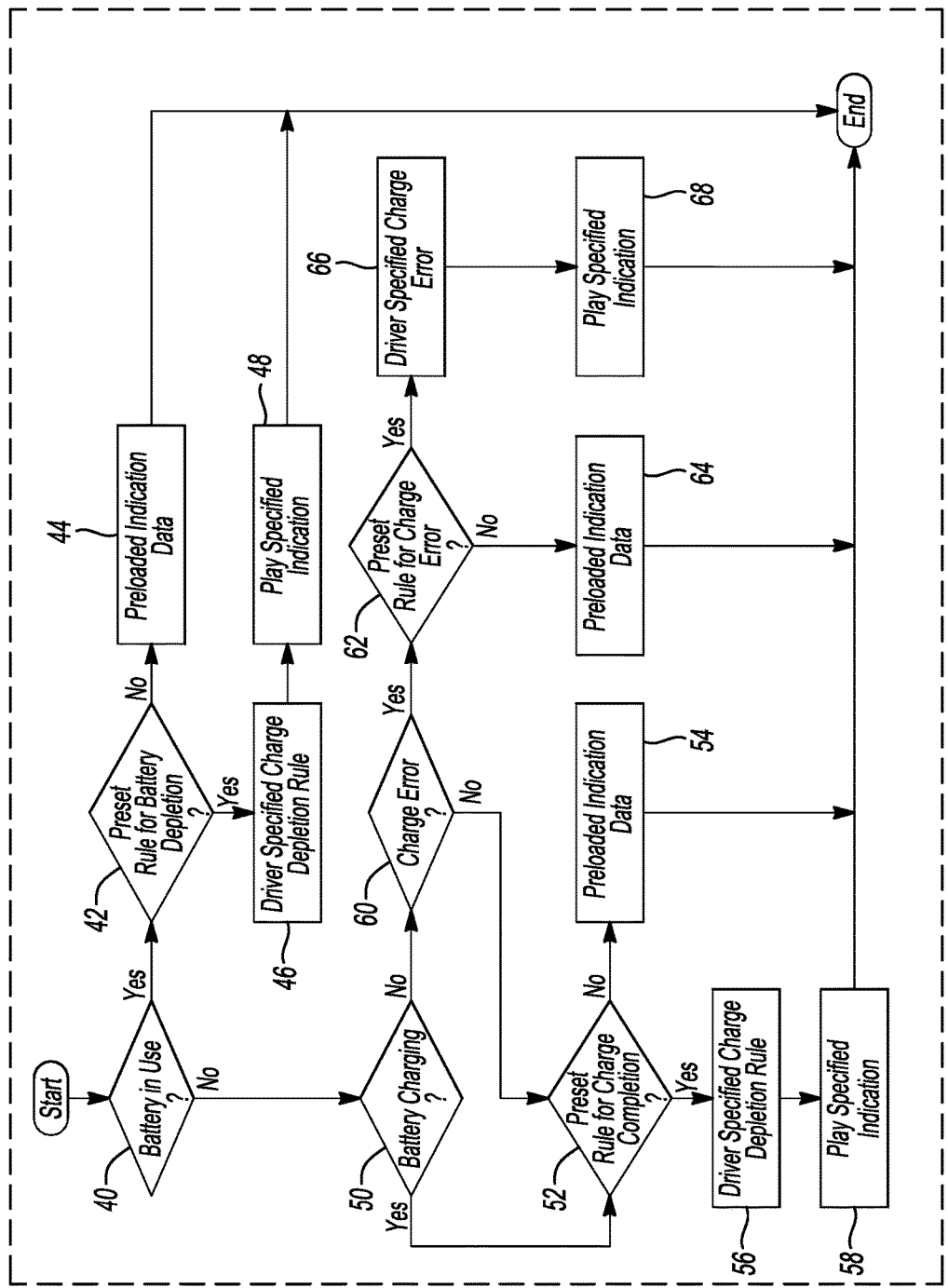
FIG. 2 is a control logic flow diagram for providing a charge completion indication.

FIG. 2 depicts a flow chart of the control logic used by the controller 20 for the battery charging alert system. At 40, the controller 20 determines if the battery is in use. The battery is in use if the vehicle is on and the battery is being used to propel the vehicle. If at 40, the controller 20 determines that the battery is in use indicating charge depletion of the battery, the controller 20 at 42 determines if the driver has preset a rule for battery depletion. At 42, if the controller 20 determines that there has not been a driver specified rule to instruct the controller 20 when to provide a driver specified indication when the battery crosses a driver specified charge level threshold indicative of the state of charge of the battery, the controller 20 may use a preloaded indication in charge level thresholds at 44. If at 42, the controller 20 determines that there is a driver specified rule to instruct the controller 20 when to provide a driver specified indication when the battery crosses a driver specified charge level threshold indicative of the state of charge of the battery, the controller 20 accesses the rule at 46.

As stated above, accessing the rule at 46 provides the controller 20 with data indicative of driver specified sequencing for both the charge level thresholds that indicate the state of charge of the battery as well as the indication sequencing that relates to the specified charge level thresholds. Accessing the rule at 46 also allows the controller 20 to provide the various indications described above to the paired device. The controller 20 uses the data from the rule at 46 to play the specified indication at the specified charge level threshold crossing consistent with battery depletion at 48. Referring back to 40, if the controller 20 determines that the battery is not in use, the controller 20 may determine if the battery is charging at 50. The controller 20 determines that the vehicle is charging at 50 by verifying that the charge cable is connected at the charge port, for example. The controller 20 may also verify at 50 that the vehicle is charging through any wireless charging system.

If at 50, the controller 20 determines that the battery is charging, indicating charge completion of the battery, the controller 20 determines at 52 if a driver has specified a rule to provide a custom indication for when the state of charge of the battery crosses custom charge completion thresholds.

As stated above, the charge completion thresholds at 52 may be different than the customized charge depletion thresholds at 42. Likewise, the custom indications for battery completion at 52 may be different than the customized indications for charge depletion at 42. If at 52, the controller determines that the driver has not specified a rule indicative of driver specified indications and charge completion thresholds, the controller 20 may use a preloaded indication and charge level thresholds indicative of the state of charge of the battery at 54. If at 52, the controller 20 determines that a driver has specified a rule to provide for custom indication for when the state of charge of the battery crosses custom charge completion thresholds, the controller 20 accesses the rule at 56.

Similar to charge depletion, accessing the rule at 56 provides the controller 20 with data indicative of driver specified sequencing for both the charge level threshold, as well as the indication sequencing that relates to the specified charge level thresholds. Again, accessing the rule at 56 allows the controller 20 to provide the various indications described above to the paired device 28. The controller 20 uses the data from the rule at 56 to play the specified indication that the specified charge level threshold crossing is consistent with battery completion at 58. The specified indications and the specified charge level thresholds at 58 may be the same sequencing as the charge level depletion at 48 sequencing. The specified indications in the specified charge level thresholds at 58 may also be different sequencing as the charge level depletion sequencing at 48. Both the charge completion sequencing at 58 and the charge depletion sequencing at 48 may implement any driver specified alert or threshold as described in FIG. 1.

Referring back to 50, if the controller determines that the battery is not charging, the controller 20 determines if there is a charge error at 60. The charge error at 60 may include an improperly connected charge cable to the charge port, miscommunication through wireless charging, or any other issue that prevents the charge cord from charging the battery. If at 60, the controller determines that there is not a battery charge error, the controller 20 determines at 52 if the driver has specified a rule to provide custom indication for the state of charge the battery crosses custom charge completion thresholds. If at 60, the controller determines there is a battery charge error, the controller determines at 62 if the driver has specified a rule to provide custom indications for the charge error. If at 62, the driver has not specified a rule for custom indication of the charge error, the controller 20 selects a preloaded indication for a charge error at 64. If at 62, the driver has specified a rule for customizing indication of a charge error, the controller 20 accesses the rule at 66. The controller 20 uses the data from the rule at 66 to play the specified indication selected for a charge error at 68. Customization of the charge error at 66 is consistent with the customization of both charge completion and charge depletion of the battery. The battery charging alert system provides for complete customization for driver to be alerted during instances of battery charging.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system comprising:
a controller configured to, responsive to a charge for a vehicle battery exceeding a first threshold, activate a transducer to produce a first user-specified sound to indicate exceeding the first threshold, and responsive to the charge exceeding a second threshold, activate the transducer to produce a second user-specified sound different than the first to indicate exceeding the second threshold, wherein the first threshold is less than the second threshold.

2. The system of claim 1, wherein the controller is further configured to, in response to the charge exceeding a user-specified threshold, activate the transducer to produce a third user-specified sound to indicate that the charge has exceeded the user-specified threshold.

3. The system of claim 2, wherein the controller is further configured to, in response to the charge falling below the user-specified threshold, activate the transducer to produce another user-specified sound to indicate that the charge has fallen below the user-specified threshold.

4. The system of claim 1, wherein the controller is further configured to, in response to the charge falling below the second threshold, activate the transducer to produce another user-specified sound to indicate that the charge has fallen below the second threshold.

5. The system of claim 1, wherein the controller is further configured to, in response to the charge falling below the first threshold, activate the transducer to produce another user-specified sound to indicate that the charge has fallen below the first threshold.

6. The system of claim 1, wherein the controller is further configured to, in response to the battery indicating an error during charge, activate the transducer to produce a user-specified sound indicative of the error.

7. A vehicle comprising:
an audio transducer; and
a controller configured to, in response to a state of charge (SOC) of a battery crossing a charge level threshold (CLT) set by a user of the vehicle, activate the audio transducer to generate an indication that the SOC has crossed the CLT defined by data provided by the user and linked with the CLT according to a rule specified by the user, wherein the CLT is defined by a range of intervals that increase until the battery is completely charged.

8. The vehicle of claim 7, wherein the controller is further configured to communicate the CLT to an external device paired with the controller via a network.

9. The vehicle of claim 7, wherein the controller is further configured to upload the data from a device paired with the controller.

10. The vehicle of claim 7, wherein the controller is further configured to download the data from an external server.

11. A control method for a vehicle comprising:
in response to a state of charge (SOC) of a battery crossing a charge level threshold (CLT) set by a user of the vehicle being indicative of battery charging, operating a controller to generate an indication that the SOC has crossed the CLT that is defined by data provided by the user and linked with the CLT according to a rule specified by the user.

12. The control method of claim 11 further comprising uploading by the controller the data to an internal storage from a paired device.

13. The control method of claim 11 further comprising downloading by the controller the data to an internal storage from an external server.

14. The control method of claim 11 further comprising, in response an indication that the battery is experiencing an error state, operating the controller to generate an indication that the battery is experiencing an error state and that is defined by additional data provided by the user and linked with the error state according to an additional rule specified by the user.

15. The control method of claim 11, wherein the indication is an audio tone.

16. The control method of claim 11, wherein the indication is light from a light source.

* * * * *